United States Patent
Hirtenlehner et al.

(10) Patent No.: US 11,235,653 B2
(45) Date of Patent: Feb. 1, 2022

(54) DOOR SEALING DEVICE, DOOR SEALING SYSTEM AND DOOR LEAF FOR A RAIL VEHICLE

(71) Applicant: KNORR-BREMSE GmbH, Moedling (AT)

(72) Inventors: Thomas Hirtenlehner, Aschbach (AT); Peter Jetzinger, Enns (AT)

(73) Assignee: KNORR-BREMSE GmbH, Moedling (AT)

( * ) Notice: Subject to any disclaimer, the term of this patent is extended or adjusted under 35 U.S.C. 154(b) by 648 days.

(21) Appl. No.: 15/508,351

(22) PCT Filed: Sep. 1, 2015

(86) PCT No.: PCT/EP2015/069962
§ 371 (c)(1),
(2) Date: Jun. 21, 2019

(87) PCT Pub. No.: WO2016/034589
PCT Pub. Date: Mar. 10, 2016

(65) Prior Publication Data
US 2020/0009954 A1    Jan. 9, 2020

(30) Foreign Application Priority Data
Sep. 2, 2014 (DE) .................. 20 2014 104 110.9

(51) Int. Cl.
*B60J 10/24* (2016.01)
*B60J 10/277* (2016.01)
(Continued)

(52) U.S. Cl.
CPC .............. *B60J 10/24* (2016.02); *B60J 10/27* (2016.02); *B60J 10/277* (2016.02); *B60J 10/30* (2016.02); *F16J 15/027* (2013.01); *B60J 10/86* (2016.02)

(58) Field of Classification Search
CPC . B60J 10/21; B60J 10/24; B60J 10/242; B60J 10/244; B60J 10/246; B60J 10/248; B60J 10/277; B60J 10/30; F16J 15/027
See application file for complete search history.

(56) References Cited

U.S. PATENT DOCUMENTS 2,724,877 A  *  11/1955  Ramsay .................. B60J 10/27
                                                   49/490.1
3,958,369 A  *   5/1976  Mathellier ............ E06B 7/2309
                                                    49/479.1
(Continued)

FOREIGN PATENT DOCUMENTS

CN        203305823 U     11/2013
DE          2401465 A1     7/1975
(Continued)

OTHER PUBLICATIONS

Delivery note from Gebr. Bode GMBH & Co. KG Fahrzeugtuesysteme for various parts of a door system, technical drawings and invoice, May-Aug. 2013, 21 Pages.

*Primary Examiner* — Nicholas L Foster
(74) *Attorney, Agent, or Firm* — Norton Rose Fulbright US LLP; Gerard Messina

(57) ABSTRACT

The present invention relates to a door sealing device sealing a gap between a door leaf and a frame for a rail vehicle, where the door sealing device includes a flexible tubular hollow chamber formed by two opposite contact walls and two opposite side walls, where, in the mounted state of the door sealing device, a first contact wall of the contact walls faces the door leaf and a second contact wall of the contact walls faces the frame so that the hollow chamber is subject to compression in the event of a closing motion of the door leaf, thereby moving the contact walls towards each other, (Continued)

and where the sidewalls are formed to be buckled along predetermined buckle lines in response to the compression.

12 Claims, 6 Drawing Sheets

(51) Int. Cl.
*B60J 10/30* (2016.01)
*B60J 10/27* (2016.01)
*F16J 15/02* (2006.01)
*B60J 10/86* (2016.01)

(56) References Cited

U.S. PATENT DOCUMENTS

| | | | | |
|---|---|---|---|---|
| 4,143,497 A | * | 3/1979 | Offenbacher | B60J 10/24 |
| | | | | 49/490.1 |
| 4,381,115 A | * | 4/1983 | Ko | E06B 7/2309 |
| | | | | 277/641 |
| 4,761,917 A | * | 8/1988 | Knecht | E06B 7/2318 |
| | | | | 296/207 |
| 5,072,545 A | * | 12/1991 | Nozaki | B60J 10/248 |
| | | | | 49/490.1 |
| 5,269,101 A | * | 12/1993 | Nozaki | B60J 10/21 |
| | | | | 49/479.1 |
| 5,581,951 A | | 12/1996 | Ryan et al. | |
| 6,116,615 A | * | 9/2000 | Trehan | H05K 9/0015 |
| | | | | 174/358 |
| 7,055,285 B2 | * | 6/2006 | Nozaki | B60J 10/21 |
| | | | | 49/440 |
| 7,219,899 B2 | * | 5/2007 | Kesseg | F16J 15/025 |
| | | | | 277/645 |
| 2005/0008819 A1 | * | 1/2005 | Kubo | B60J 10/21 |
| | | | | 428/122 |
| 2006/0108747 A1 | | 5/2006 | Kesseg | |
| 2008/0012244 A1 | * | 1/2008 | Kesseg | F16J 15/025 |
| | | | | 277/645 |
| 2008/0246304 A1 | | 10/2008 | Huttebraucker et al. | |
| 2013/0025211 A1 | | 1/2013 | Zaccaria et al. | |
| 2019/0193758 A1 | * | 6/2019 | Zarl | B61D 19/005 |
| 2019/0389292 A1 | * | 12/2019 | Sakai | B60J 10/246 |

FOREIGN PATENT DOCUMENTS

| | | |
|---|---|---|
| DE | 20316762 U1 | 1/2004 |
| DE | 202008002914 U1 | 8/2009 |
| FR | 2519399 A1 | 7/1983 |
| JP | H01144148 U | 10/1989 |
| JP | H0349139 U | 5/1991 |
| JP | H06305335 A | 11/1994 |
| JP | 2013100010 A | 5/2013 |
| JP | 2013256214 A | 12/2013 |
| WO | 2007/147570 A1 | 12/2007 |

* cited by examiner

DOOR SEALING DEVICE, DOOR SEALING SYSTEM AND DOOR LEAF FOR A RAIL VEHICLE

FIELD OF THE DISCLOSURE

The present invention relates to a door sealing device, to a door sealing system and to a door leaf for a rail vehicle.

BACKGROUND OF THE DISCLOSURE

Lip seals with limited travel (e.g. 3 mm) often are employed for sealing door leaves with respect to the outer shell of the carriage in the field of rail vehicles. Furthermore, the existing seals have the property of an almost linear force increase with rising seal travel. In the field of rail vehicles, active seals that have to be actuated by an additional actuator (e.g. inflating the seals when the door is closed) can be found sporadically.

It is the object of the present invention to provide an improved door sealing device, an improved door sealing system and an improved door for a rail vehicle.

This object is achieved by a door sealing device, a door sealing system and a door leaf for a rail vehicle according to the main claims.

SUMMARY

A hollow chamber with sidewalls that can be buckled may be employed in an advantageous way for a seal for a door leaf for a rail vehicle. Using such a hollow chamber, the entry system of a rail vehicle can be made highly pressure-tight and watertight.

A door sealing device for sealing a gap between a door leaf and a frame for a rail vehicle comprises a flexible tubular hollow chamber formed by two opposite contact walls and two opposite side walls. In the mounted state of the door sealing device, a first one of the contact walls faces the door leaf and a second one of the contact walls faces the frame so that, in the event of a closing motion of the door leaf, the hollow chamber is subject to compression by which the contact walls are moved towards each other. The sidewalls are formed to be buckled along predetermined buckle lines in response to the compression.

Compression may mean that, in the mounted state, the hollow chamber is compressed by the door leaf and frame approaching each other towards the end of the closing motion. Due to the sidewalls buckling outwardly during compression, the sidewalls can be moved away from each other, particularly in the region of the buckle lines. Thereby, the contact walls may be moved towards each other. An extent of an approaching movement of the contact walls between a beginning and an end of the compression may be referred to as seal travel of the door sealing device. The buckle lines may extend parallel to a longitudinal direction of extension of the hollow chamber. For example, the buckle lines may represent predefined weak spots in the sidewalls at which the sidewalls buckle in the event of load caused by the compression. For example, the sidewalls may comprise reduced wall thickness or another material, for example a more bendable material, in the region of the weak spots.

Depending on the respective embodiment, the sidewalls may be formed to become buckled outwardly or inwardly along predetermined buckle lines in response to the compression. By way of outward buckling, contact of the sidewalls when buckling inwardly may be prevented reliably.

According to an embodiment, the insides of the sidewalls may have line-shaped recesses extending along the predetermined. The recesses may be formed to cause outward buckling of the sidewalls in response to the compression. Such recesses, which may for example take the shape of notches or grooves, can easily be realized.

For example, a first sidewall of the sidewalls and a second side wall of the sidewalls may comprise a first predetermined buckle line and a second predetermined buckle line, respectively. The buckle lines may pass centrally between the contact walls in the relaxed state of the low chamber. In this way, the material stress caused by the compression may be distributed well.

According to an embodiment, the hollow chamber may be formed to provide a seal travel of at least 8 mm or of at least 10 mm in the event of compression. A relatively great seal travel may result in a high seal effect.

For example, the hollow chamber may be formed to provide, in the event of compression, a seal travel corresponding to at least one quarter or at least one third of the distance between the contact walls in the relaxed state of the hollow chamber. Thereby, the door sealing device may consume little space and may sustain greater mounting tolerances of the entry system.

According to an embodiment, the hollow chamber may have a characteristic force-travel curve with respect to a compressive force causing the compression and a seal travel caused by the compressive force with a declining gradient. Thus, starting from a relaxed state of the hollow chamber, an increase in the compressive force by a defined amount of force may cause a smaller change in the seal travel than starting from an already slightly compressed state of the hollow chamber. In this way, a great contact pressure between the contact walls of the hollow chamber and surfaces of the door leaf and of the frame may be affected so that a high seal effect can be achieved already when the seal travel is small.

According to an embodiment, the hollow chamber may be formed to enlarge a cavity enclosed by the contact walls and sidewalls when the contact walls are made to approach each other starting from a relaxed state of the cavity up to a first seal travel. Furthermore, the hollow chamber may be formed to reduce the cavity when the contact walls are made to approach each other beyond the first seal travel. In this way, required pressure equalisation between and inside of the hollow chamber and an environment of the hollow chamber can be kept low. For the pressure equalisation, there may be provided at least one through-hole in a wall, for example a sidewall of the hollow chamber.

An outside of the first contact wall may comprise a plurality of contact ridges. The first contact wall may be the contact wall facing the frame if the door sealing device is attached to the door leaf, or the contact wall facing the door leaf if the door sealing device is attached to the frame. By way of the contact regions, a great seal effect can be achieved.

The door sealing device may comprise a connecting element for connecting the door sealing device with the door leaf or the frame. The connecting element is connected to the hollow chamber. For example, the connecting element may be used to connect the door sealing device to the door leaf or the frame by means of a non-positive connection, a positive connection or an adhesive bond.

The connecting element may comprise a link connected to the hollow chamber along an outer edge of the hollow chamber connecting a first contact wall of the contact walls to a first sidewall of the sidewalls. By way of such a link, possible deformation of the hollow chamber during the compression is not impeded.

The connecting element may have an elongate bulge for establishing a positive connection with a connecting element of the door leaf or of the frame. The hollow chamber and the elongate bulge may be arranged alongside respect to each other and connected to each other via a link. For example, the bulge may be introduced into a corresponding seating of the door leaf or of the frame in order to connect the door sealing device to the door leaf or to the frame via the bulge and the seating.

For example, the elongate bulge may be formed as a further hollow chamber. Mounting ridges may be arranged on the outside of the further hollow chamber. Due to the bulge being formed as a hollow chamber, the bulge may for example be pressed into a seating for attaching the door sealing device on the frame or the door leaf. By way of the mounting ridges, a retention force between the bulge and such a seating may be increased further.

The door sealing device may be integrally made of elastic material. For example, the material may be an elastomer. The door sealing device may represent a section of a continuous profile. By way of integrally forming, the door sealing device can be produced inexpensively.

According to an embodiment, the hollow chamber may comprise a bend. In this way, the door sealing device can be used to seal a corner of the door leaf. The sidewall arranged on the inside of the bend may have a through-hole in the region of the bend. Such a-whole may be used to let air flow into or out of the hollow chamber.

Additionally or alternatively, the hollow chamber may comprise an arcuate section or a radius. The sidewall arranged on the inside of the arcuate section or the radius may have a through-hole in the region of the arcuate section or of the radius.

A door sealing system for sealing a gap between a door leaf and a frame for a rail vehicle may comprise at least two of the door sealing devices mentioned, wherein adjacent ends of the hollow chambers of the door sealing devices may be connected. Thus, for example, a linear door sealing device may be connected with a door sealing device comprising a bend. The ends may be connected to each other by means of an adhesive bond.

A door leaf for a rail vehicle comprises, along at least an edge of the door leaf, and overlap section overlapping a frame of the rail vehicle. According to an embodiment, the door leaf comprises at least one door sealing device as mentioned, the tubular hollow chamber of which is arranged along the overlap section. Correspondingly, the door leaf may comprise at least one door sealing system as mentioned, wherein the tubular hollow chambers of the door sealing system are arranged along the overlap section. In this way, a door leaf with a seal capable of ensuring pressure tightness and air tightness in the closed state can be realized.

BRIEF DESCRIPTION OF THE DRAWINGS

Preferred embodiments of the present invention will be explained in greater detail with reference to the appended drawings, in which.

DETAILED DESCRIPTION

Figure 1:
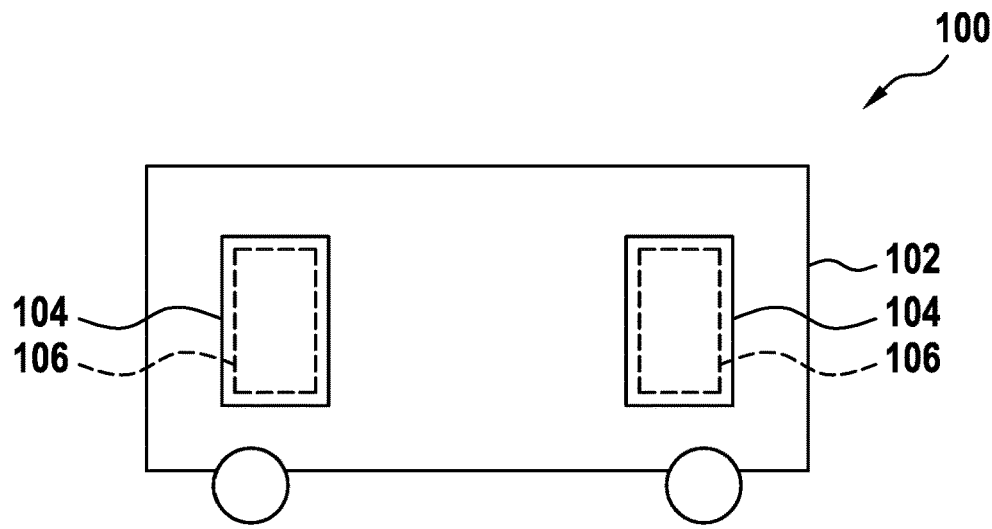
FIG. 1 shows an illustration of a rail vehicle, according to an embodiment of the present invention.

In the following description of the preferred embodiments of the present invention, the same or similar reference numerals shall be used for the elements depicted in the various figures and acting in a similar way, wherein repeated description of these elements shall be omitted.

FIG. 1 shows a schematic illustration of a rail vehicle 100, according to an embodiment of the present invention. The rail vehicle 100 comprises a frame 102 and for example to doors with one leaf 104 each. Each of the doors leaves 104 comprises a door sealing device 106 only suggested in dashed lines in FIG. 1 as positioned on the insides of the door leaves 104. The door sealing devices 106 are formed to seal a gap between the door leaves 104 and the frame 102 when the doors are closed. To this end, the door sealing devices 106 are arranged along and overlap section present between door leaves 104 and frame 102 when the doors are closed. The door sealing devices 106 may be guided along one or more edges of the door leaves 104. In FIG. 1, by way of example only, the door sealing devices 106 are arranged as running around the edges, the lower edges and the side edges of the door leaves 104.

As an alternative, the door sealing devices 106 may also be arranged on the frame 100.

Figure 2:
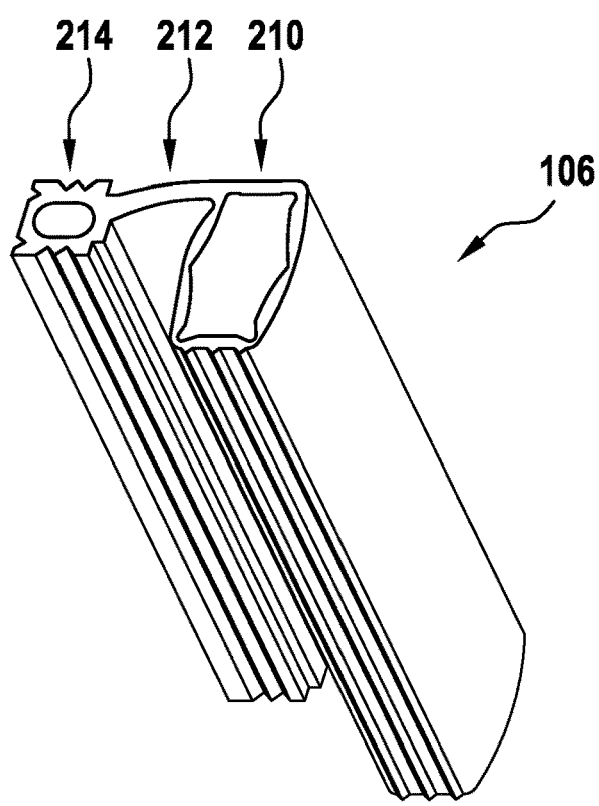
FIG. 2 shows a three-dimensional illustration of a door sealing device, according to an embodiment of the present invention.
Figure 7:
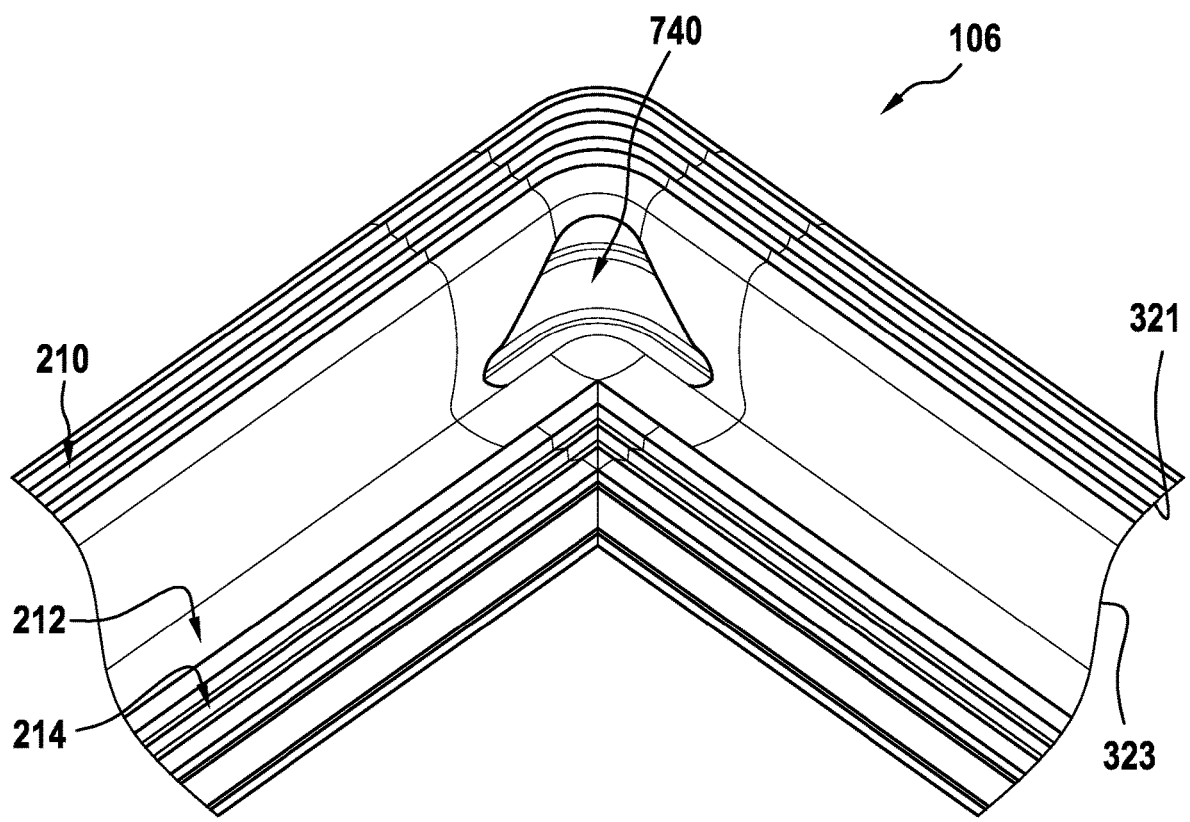
FIG. 7 shows a three dimensional illustration of a door sealing device, according to an embodiment of the present invention.

If the door sealing devices 106 are composed of several individual sections, for example of linear sections, as shown in FIG. 2, and corner sections, as shown in FIG. 7, the door sealing devices 106 may also be referred to as door sealing systems.

FIG. 2 shows a three-dimensional illustration of a door sealing device 106, according to an embodiment of the present invention. It may be a section of the door sealing device described with reference to FIG. 1. The door sealing device 106 is formed in the shape of a sealing profile.

The door sealing device 106 comprises a hollow chamber 210. The hollow chamber 210 is tubular and flexible and may be compressed in the event of a closing motion of the door leaf when arranged between a door leaf and a frame, in order to seal a gap between the door leaf and frame. According to this embodiment, a longitudinal direction of extension of the hollow chamber 210 is linear so that the hollow chamber can be arranged along a linear edge of the door leaf, for example.

The door sealing device 106 comprises an optional connecting element for connecting the door sealing device to the door leaf or to the frame. According to this embodiment, the connecting element comprises a link 212 and an elongate bulge 214. The elongate bulge 214 extends parallel to the hollow chamber 210 and is continuously connected to the hollow chamber 210 via the link 212. Thus, the link 210 continuously passes between the elongate bulge 214 and the hollow chamber 210.

When mounting the door sealing device 206, the elongate bulge can be used to establish a positive connection between the door sealing device 106 and a connecting element of the door leaf or of the frame.

Figure 3:
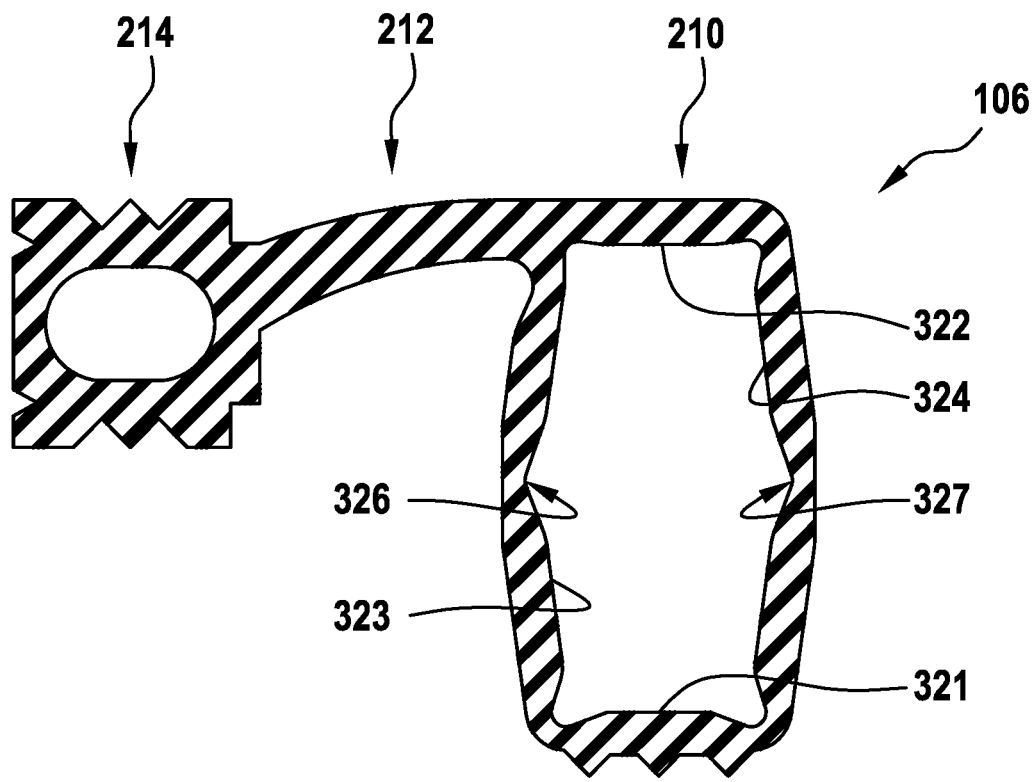
FIG. 3 shows a cross-sectional illustration of a door sealing device, according to an embodiment of the present invention.

FIG. 3 shows a cross-sectional illustration of a door sealing device 106, according to an embodiment of the present invention. It may be a seal cross-section of the door sealing device 106 shown in FIG. 2.

The tubular hollow chamber 210 of the door sealing device 106 comprises a first contact wall 321, a second contact wall 322, a first sidewall 323 and a second side wall 324 auf closing and inside of the hollow chamber 210. In an exemplary assembly of the door sealing device 106, the first contact wall 321 and the second contact wall 322 face the frame and the door leaf, respectively, in the mounted state of the door sealing device 106. In the event of a closing motion of the door leaf, the hollow chamber 210 subject to compression by which the contact walls 321, 322 are moved towards each other. In this process, the sidewalls 323, 324 are buckled along predetermined buckle lines 326, 327.

According to different embodiments, the sidewalls 323, 324 are formed as mirror images or not. According to an embodiment in which the sidewalls 323, 324 are not formed as mirror images, the shape of the hollow chamber 210 and in particular the shape of the sidewalls 323, 324 is optimized in that there is a declining force gradient for retracting angles from 90° to 35°.

According to this embodiment, a first buckle line 326 extends approximately centrally between the contact faces 321, 322 along the inside of the first sidewall 323. The first buckle line 326 passes parallel to the longitudinal direction of extension of the hollow chamber 210. A second buckle line 327 extends approximately centrally between the contact faces 321, 322 along the inside of the second side wall 324. The second buckle line 327 extends parallel to the longitudinal direction of extension of the hollow chamber 210 and thus parallel with respect to the first buckle line 326. According to this embodiment, the sidewalls 324, 324 each comprise two approximately linear sections are plotting against each other on the buckle lines 326, 327 in a slightly angled way.

According to this embodiment, the sidewalls 323, 324 are formed to become buckled outwardly, when the hollow chamber 210 is compressed, whereby sections of the sidewalls 323, 324 located in the region of the buckle lines 326, 327 move away from each other. In order to effect the outward buckling, the sidewalls 323, 324 comprise wedge-shaped recesses, for example shaped as notches or grooves, extending along the buckle lines 326, 327.

A plurality of contact ridges, here three contact ridges, for example, are arranged on an outside of the first contact wall 321. The contact ridges extend along the longitudinal direction of extension of the hollow chamber 210.

According to this embodiment, the link 212 is connected to an outer edge of the hollow chamber 210 formed by the first sidewall 323 and the second contact wall 322. The link 212 forms a sort of extension of the second contact wall 322 and is slightly bent.

The elongate bulge 214 is connected to the link 212 at an end of the link 212 opposite to the hollow chamber 210. According to this embodiment, the elongate bulge 214 is formed as a further hollow chamber. As an alternative, the elongate bulge 214 may also be solid, without any cavity. Mounting ridges extending parallel to a longitudinal direction of extension of the elongate bulge 214 are arranged on the outside of the elongate bulge 214.

According to this embodiment, a height of the sidewalls 323, 324 is more than twice a height of the contact walls so that a distance of the contact walls 321, 322 from each other is more than twice a distance of the sidewalls 323, 322 from each other. A width of the link 212 between the elongate bulge 214 and the hollow chamber 210 is slightly greater than the height of the second contact wall 322. The elongate bulge 214 has a rectangular outline, wherein the lengths the outer sides of the elongate bulge are approximately equal to the height of the second contact wall 322. In FIG. 3, upward-facing faces of the second contact wall 322 and of the elongate bulge 214 are about on the same level.

Figure 4:
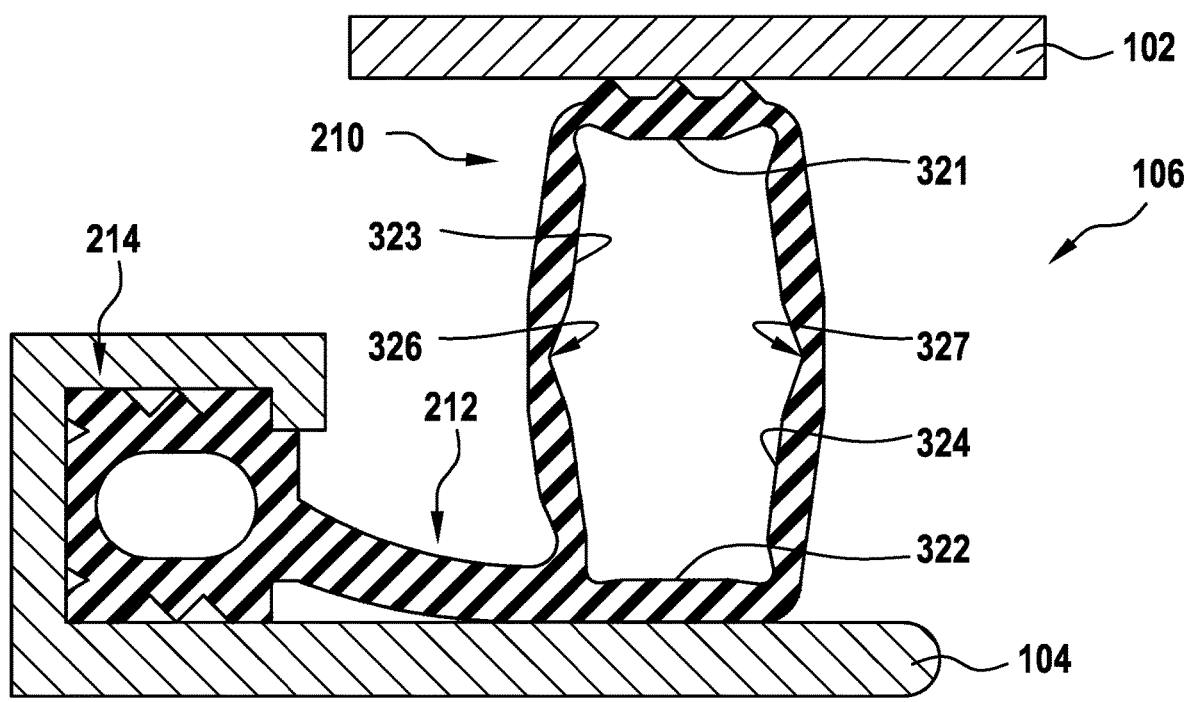
FIG. 4 shows an illustration of a door sealing device in a mounted state, according to an embodiment of the present invention.

FIG. 4 shows an illustration of a door sealing device 106 in a mounted state, according to an embodiment of the present invention. It may be the door sealing device 106 as described with reference to FIG. 3.

According to this embodiment, the door sealing device 106 is attached to a door leaf 104. To this end, the elongate bulge 214 is introduced into a connecting element of the door leaf 104, wherein the connecting element forms a kind of groove. For establishing a positive connection between the connecting element and the bulge 214, a free end of the connecting element is formed with a stopper facing the link 212. The first contact wall 321 of the hollow chamber of the door sealing device 106 abuts on a surface of the door leaf 104 in a laminar way.

In FIG. 4, the seal is shown as uncompressed. Here, a distance between the door leaf 104 and the frame 102 equates to a height of the hollow chamber of the door sealing device 106 in the relaxed state. Here, the sealing ridges of the second contact wall 322 contact a surface of the frame 102. The contact walls 321, 322 are aligned at least approximately parallel to each other. In the relaxed state, the sidewalls 324, 324 are slightly buckled along the buckle lines 326, 327 so that the sidewalls 324, 324 are slightly outwardly angled or convex.

Figure 5:
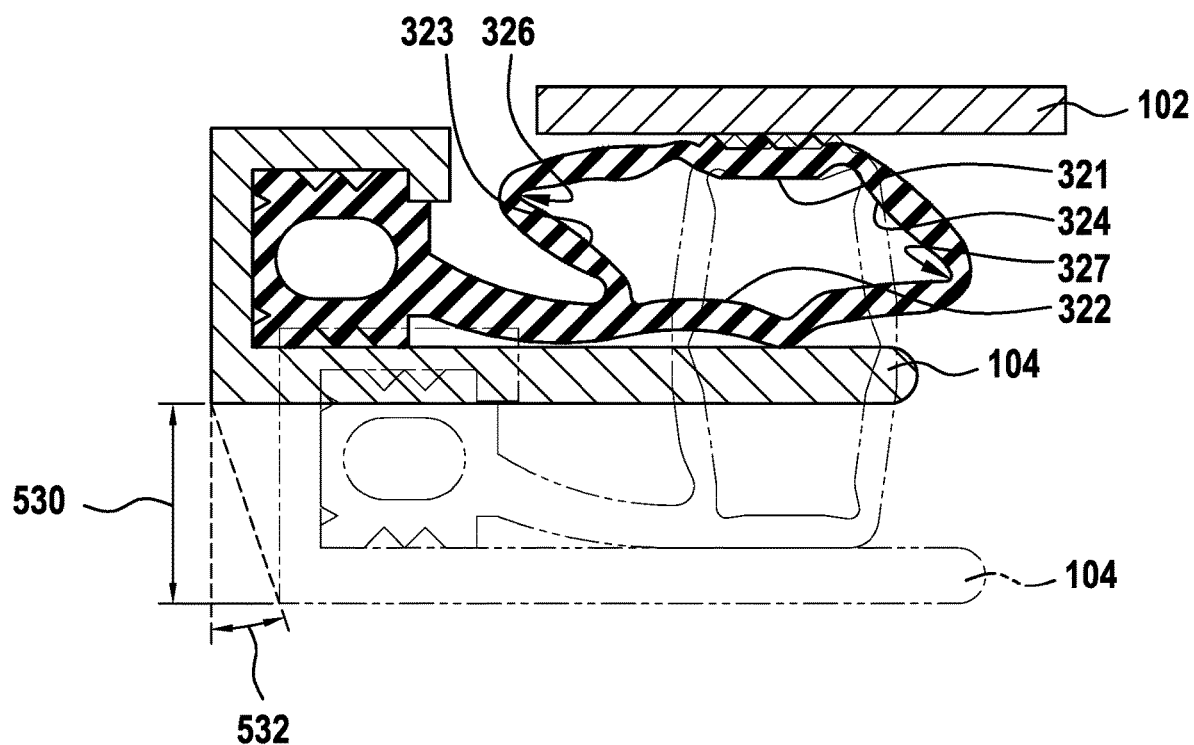
FIG. 5 shows an illustration of compression of a mounted door sealing device, according to an embodiment of the present invention.

FIG. 5 shows an illustration of a compression of a mounted door sealing device 106, according to an embodiment of the present invention. The door sealing device 106 is shown both in the relaxed state as shown in FIG. 4 and in a compressed state in which the hollow chamber is compressed due to the door leaf 104 and the frame 102 being closer together as compared to FIG. 4 so that the seal is compressed. Because of the compression, the sidewalls 323, 324 are buckled outwardly along the buckle lines 326, 327. Here, the sidewalls 324, 324 each continue to have two approximately linear sections abutting against each other on the buckle lines 326, 327 in a strongly angled manner. The sealing ridges of the second contact wall 322 are in contact with the frame 102, and the first contact wall 321 abuts against the door leaf 104 at least along the edges. Thus, the gap between the frame 102 and the door leaf 104 is sealed by the hollow chamber of the door sealing device 106.

For example, the seal travel 530 of the hollow chamber of the door sealing device 106 may be at least 8 mm, at least 10 mm according to an embodiment, between the states shown in FIGS. 4 and 5.

What is also illustrated in FIG. 5 is a retracting angle 532 of the door leaf 104.

Figure 6:
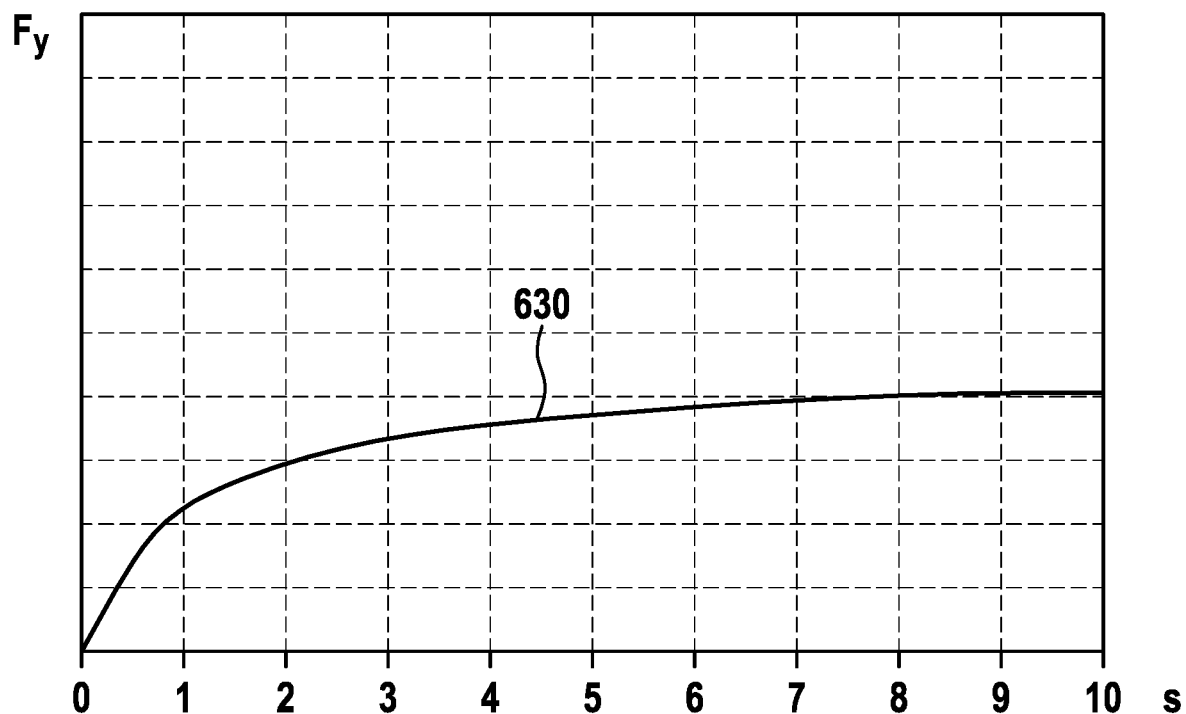
FIG. 6 shows an illustration of a ceiling force gradient of a door sealing device, according to an embodiment of the present invention.

FIG. 6 shows an illustration of a sealing force gradient 630 of a door sealing device, according to an embodiment of the present invention. It may be the door sealing device shown in FIG. 5, for example. The swivel-in path s in millimetres from 0 mm to 10 mm is plotted on the abscissa, and the swivel-in force Fy in N/mm of profile length is plotted on the ordinate. Forces Fy when swivelling in are illustrated.

A swivel-in path of 0 mm may correspond to the relaxed state of the door sealing device as shown in FIG. 4. A seal travel of 10 mm may correspond to the compressed state of the door sealing device as shown in FIG. 5. From the ceiling force gradient 630, which may be regarded as a characteristic force-travel curve, it can be seen that the swivel-in force sharply rises at the beginning of the swivel-in, for example at a seal travel between 0 mm and 1 mm, and rises only slightly with continued swivel-in or hardly rises any more beyond a swivel-in path of 5 mm.

FIG. 7 shows a three-dimensional illustration of a door sealing device 106, according to an embodiment of the present invention. The door sealing device 106 is formed as a corner piece. The door sealing device 106 comprises a bend in its longitudinal direction of extension. The legs of the door sealing device 106 adjoining the bend each have a linear course, corresponding to the door sealing device described with reference to FIG. 2. According to this embodiment, the bend is orthogonal, but may also have another angle and radius for rounded corners. Instead of a bend, the door sealing device 106 may thus also have an arcuate section.

In the region of the bend, the second side wall 323 of the hollow chamber 210 the door sealing device 106 comprises a through-hole 740 via which pressure equalisation between the inside of the hollow chamber 210 and the outside environment may take place. In this way, ventilation of a door sealing device comprising several bends or radii may be effected via the corners.

Based on the preceding figures, embodiments of a door sealing system based on at least one door sealing device 106 as described shall be described in detail in the following. Here, the door sealing device shall be described by way of example based on a seal of door leaves 104 in the rail vehicle field.

The door sealing device 106 may ensure a seal travel 530 of at least 10 mm for ensuring pressure tightness and water tightness. Here, the tightness may be ensured both in case of portal tolerances and mounting tolerances on the vehicle 100 and in case of dynamic stress, for example due to pressure surges because of tunnels passing trains, whereby passenger convenience is increased.

The door sealing device 106 provides an optimized force gradient when the seal is being compressed. Here, the force curve 630 has a declining gradient. This means that the force rises sharply at the beginning of compression and remains approximately constant for the remaining travel. This is achieved by the outward buckling of the profile 210. Pressure tightness already is achieved after little seal travel. At the maximum travel 530, the maximally admissible compressive force of the seal, for example 10N/100 mm, is not exceeded.

As shown with reference to FIG. 7, ventilation of the hollow chamber 210 of the seal is effected via the corners. On the one hand, the opening 740 for ventilation also serves to prevent the profiles converging in the corner do not collide with themselves in the event of compression. On the other hand, this opening 740 is used for demoulding (core removal) during production.

The chamber 210 is subject to little volume change for the relevant seal travel. Hence, only minimum volume flow occurs through the openings 740 in the corners during the compression of the seal.

Given the described shape of the seal, swivel-in movements from 35° to 90° and folds in the door leaf of up to 40° are possible, without significantly influencing the declining gradient of the characteristic force-travel curves 630.

By way of ridges or moves on the second contact wall 322, friction can be reduced. The seal is not compressed kinematically below 90°, because the doors swivel in at an angle between 35° and <90°, whereby the seal profiles top and bottom in the door leaf 104 additionally subject to longitudinal motion and thus friction between seal and seal frame 102 upon contact. According to an embodiment, the sealing profile comprises grooves for reducing the contact area and thereby also reducing the frictional force.

The door sealing device as described allows for an advantageous mounting concept. All connections in the seal frame are formed identically (connection of sealing profile to formed components). Thus, only one or one process is necessary for the connection, for example 6 connections are required per seal frame, and the seal frame may easily be tailored in the factory according to requirements, for example using a continuous sealing profile and corresponding formed components in stock.

The approach described allows for very good sealing of the door leaves 104 regarding pressure and water. Herein, a great seal travel 530 is provided in order to compensate for portal tolerances and mounting tolerances. Furthermore, a declining sealing force gradient 630 is provided, wherein pressure tightness is achieved already after little seal travel. Advantageously, optimized volume flow for ventilation occurs upon compression.

According to an embodiment, a door sealing device 106 having the profile cross-section shown with reference to FIG. 3 is used at the top, back and bottom of the door leaf 104. At the front, mostly a further profile cross-section is used, wherein it is not excluded that the profile cross-section shown in FIG. 3 is used also at the front.

The corners, as shown in FIG. 7, for example, mostly consist of a formed component, wherein the trimmed continuous profile, which may be used for the legs adjoining the end shown in FIG. 7, for example, may be vulcanised in the same go. A complete door sealing system usually consists of the continuous profile cross-section, optionally a further continuous profile cross-section and corner parts. However, it should not be excluded for the continuous profile cross-sections to be connected to each other without corner part or in the corner.

The embodiments described are chosen as examples only and may be combined with each other.

The invention claimed is:

1. A door sealing device for sealing a gap between a door leaf and a frame for a rail vehicle, comprising:
   a flexible tubular hollow chamber formed by two opposite contact walls and two opposite side walls, in a mounted state of the door sealing device, wherein the door sealing device is for sealing the gap between the door leaf and the frame for the rail vehicle;
   wherein a first contact wall of the contact walls faces the door leaf and a second contact wall of the contact walls faces the frame so that the hollow chamber is subject to compression in the event of a closing motion of the door leaf, to move the contact walls towards each other, and
   wherein the sidewalls are formed to be buckled along predetermined buckle lines in response to the compression,
   wherein a connecting element includes a link connected to the hollow chamber along an outer edge of the hollow chamber connecting the first contact wall of the contact walls to a first sidewall of the sidewalls, wherein the connecting element includes an elongate bulge for establishing a positive connection with another connecting element of the door leaf or the frame, and wherein the hollow chamber and the elongate bulge are arranged alongside each other and connected to each other via the link, wherein the elongate bulge extends parallel to the hollow chamber and is continuously connected to the hollow chamber via the link, so that the link continuously passes between the elongate bulge and the hollow chamber, wherein the contact walls are aligned at least approximately parallel to each other, wherein a first sidewall of the sidewalls includes only a single buckle line, formed as a first predetermined buckle line, and a second side wall of the sidewalls includes only a single buckle line, formed as a second predetermined buckle line, wherein the hollow chamber includes, starting from a relaxed state of the hollow chamber, a characteristic force-travel curve with respect to a compressive force causing the compression and a seal travel caused by the compressive force with a declining gradient, and wherein the hollow chamber is formed to provide, when a compression occurs, a seal travel of at least 8 mm.

2. The door sealing device according to claim 1, wherein the sidewalls are formed to be buckled outwardly along the predetermined buckle lines in response to the compression.

3. The door sealing device according to claim 2, wherein insides of the sidewalls include line-shaped recesses extending along the predetermined buckle lines and formed to cause the outward buckling of the sidewalls in response to the compression.

4. The door sealing device according to claim 1, wherein the buckle lines extend centrally between the contact walls in a relaxed state of the hollow chamber.

5. The door sealing device according to claim 1, wherein the hollow chamber is formed to provide, in the event of compression, a seal travel corresponding to at least one quarter of the distance between the contact walls in the relaxed state of the hollow chamber.

6. The door sealing device according to claim 1, wherein the hollow chamber is formed to enlarge a cavity enclosed by the contact walls and sidewalls when the contact walls are made to approach each other starting from a relaxed state of the hollow chamber to a first seal travel, and formed to reduce the cavity when the contact walls are made to approach each other beyond the first seal travel.

7. The door sealing device according to claim 1, wherein an outside of the first contact wall of the contact walls includes a plurality of contact ridges.

8. The door sealing device according to claim 1, wherein the door sealing device includes a connecting element for connecting the door sealing device to the door leaf or the frame, and wherein the connecting element is connected to the hollow chamber.

9. The door sealing device according to claim 1, wherein the door sealing device is integrally formed of elastic material.

10. The door sealing device according to claim 1, wherein (i) is satisfied, so that the hollow chamber includes the bend and one of the sidewalls, arranged on the inside of the bend, includes the through-hole in the region of the buckle.

11. The door sealing device according to claim 1, wherein (ii) is satisfied, so that the hollow chamber includes the radius and one of the sidewalls, arranged on the inside of the radius, includes the through-hole in the region of the radius.

12. The door sealing device according to claim 1, wherein the elongate bulge is formed as a further hollow chamber, with mounting ridges being arranged on an outside of the further hollow chamber.

* * * * *